INVENTOR:
ULRIC B. BRAY

INVENTOR:
ULRIC B. BRAY

United States Patent Office 3,318,809
Patented May 9, 1967

3,318,809
COUNTER CURRENT CARBONATION PROCESS
Ulric Bannister Bray, Pasadena, Calif., assignor to Bray Oil Company, Los Angeles, Calif., a limited partnership of California
Filed July 13, 1965, Ser. No. 471,666
6 Claims. (Cl. 252—33)

This invention relates to the manufacture of dispersions of carbonates in oil and particularly to the dispersion in lubricating oils of the carbonates of alkaline earth metals such as calcium and barium. These dispersions are especially valuable for use in lubricating oils employed in internal combustion engines where the alkaline earth metal carbonates neutralize the acids which are produced in the operation of the engine. They accordingly protect the metal parts of the engine from corrosion by acids and also serve to prevent the formation of sludge in the oil which occurs as a result of acid catalyzed condensation reactions. In order to be satisfactory for this purpose, it is necessary that the particle size of the carbonate be of the order of one tenth micron or smaller; otherwise, abrasion of the machinery may result and the oil may assume a cloudy appearance which is unacceptable to the market. Particles of this size are invisible and such oil dispersions are transparent.

Numerous processes have been developed for producing such dispersions but many of them have been objectionable because of inability to control the particle size or for various other reasons such as difficulty in filtration of the oil produced in the process owing to the formation of unfilterable material of excessive particle size. In general, these processes involve carbonation of the calcium or barium oxide or hydroxide in water or in suspension in alcohol, particularly methanol. This carbonation may be carried out either in the presence of a lubricating oil and a dispersing agent such as calcium sulphonate or it may be conducted in a methanol suspension of lime or baryta which is subsequently combined with the oil and dispersing agent. The latter method is described in the United States Patent 3,105,049. I have now discovered numerous advantages for carrying out this latter type of carbonation reaction in a counter-current contacting zone followed by an aging zone wherein the products of the reaction are maintained in intimate contact with oil and dispersing agent for a controlled period of time.

Figure 1:
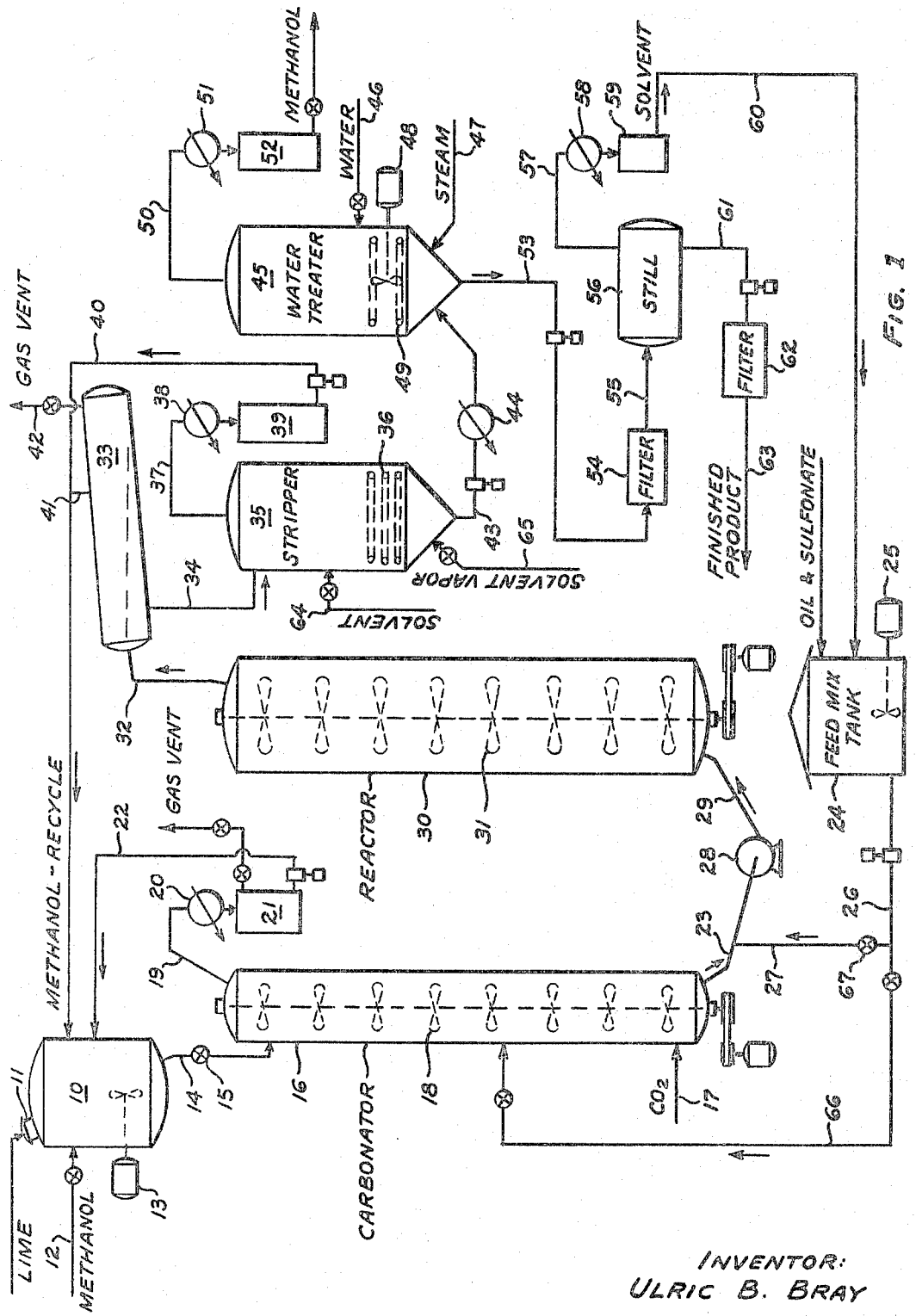
Figure 2:
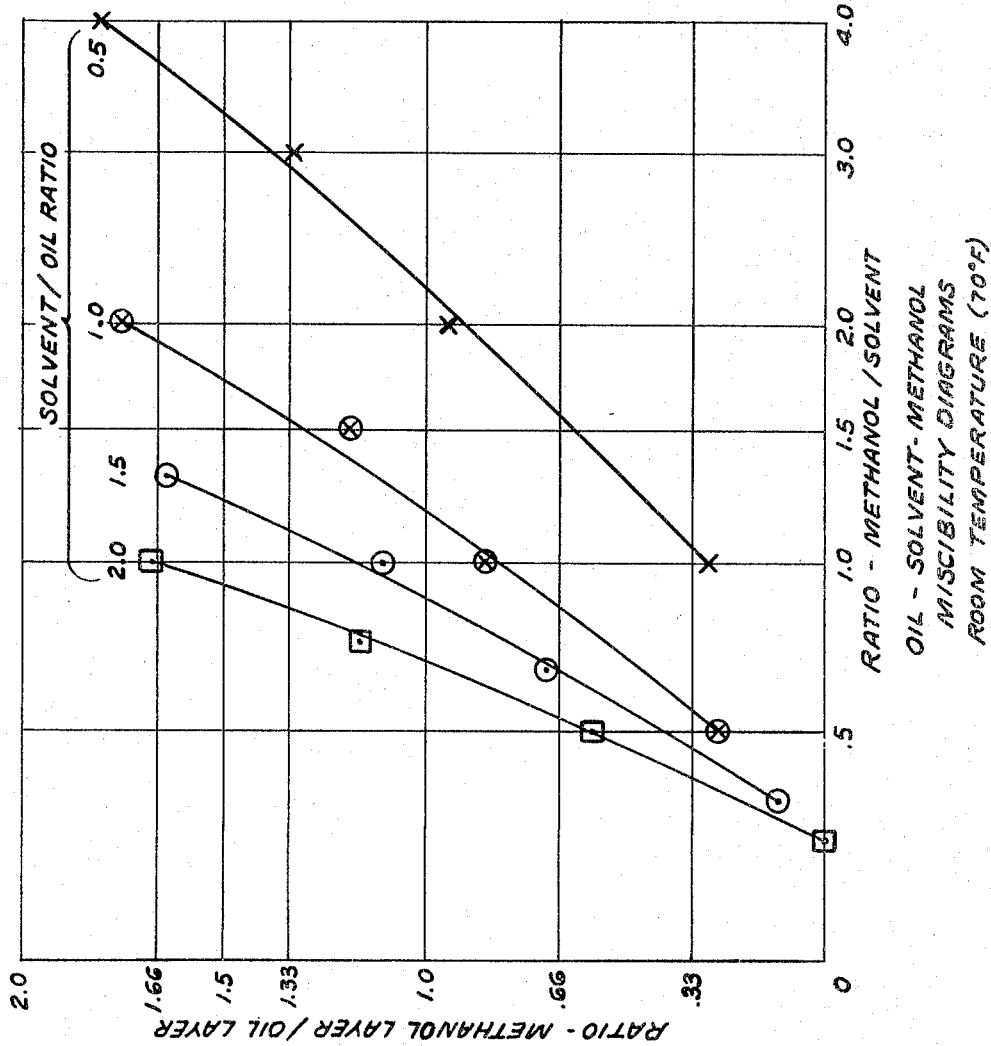

My process is illustrated by a drawing which shows in FIGURE 1 an apparatus suitable for carrying out the process. FIGURE 2 is a miscibility diagram showing the relationship between methanol and solvent concentration and its effect on the separation of the oil and methanol phases occurring in the process.

One of the objects of my invention is to carry out the absorption of carbon dioxide in a dispersion of lime and methanol in a manner to obtain substantially complete absorption in a very short time. Another object is to quench the reaction product after a critical time has elapsed and, at the same time, controlling the conditions to obtain a complete reaction. Another object of my invention is to effect cooling of the initial carbonation product at a critical stage, thereby prolonging the time before gelling. Other objects of the invention will become apparent as the description thereof proceeds.

In describing my invention, I will describe its application to calcium dispersions and particularly dispersions resulting from the carbonation of calcium oxide in methanol, it being understood that barium oxide can also be employed in place of calcium oxide. The calcium oxide employed in my process should be ground to a fine particle size in order to obtain nearly complete reaction in the short time available. Calcium oxide powder having a mesh size of about 300 to 325 is preferred and, in general, I employ a calcium oxide which will all pass 250 mesh and about 95% will pass 300 mesh. I prefer to use about 5–10% excess of calcium oxide in relation to the amount of carbon dioxide employed. In this way I find it possible, operating counter-currently, to obtain substantially complete absorption of carbon dioxide in the methanol-lime dispersion, thereby making it unnecessary to recover unabsorbed carbon dioxide from the reaction. The oil employed in my process is preferably a lubricating oil having about 20 to 40% or more of dispersing agent, preferably calcium mahogany sulfonate. Sulfonates of the preferentially oil soluble type are desired. These may be obtained by sulfonation of lubricating oils having upwards of about 400 viscosity Saybolt at 100° F. Other dispersing agents of the oil soluble type usually having a molecular weight corresponding to about 15 to 30 carbon atoms or more can be employed such as the alkyl benzene sulfonates and the phosphonated hydrocarbons. These phosphorus compounds are conveniently prepared by reacting phosphorus sulfide with an olefin polymer followed by hydrolysis in a manner well known in the art.

In order to obtain more rapid contact between the oil and methanol phases, I find it desirable to employ a hydrocarbon solvent to reduce the viscosity of the oil-sulfonate solution. Petroleum naphtha boiling in the range of about 250 to 300° F. is suitable. I can also use aromatic hydrocarbons such as benzene, toluene, xylene, etc., but I prefer to employ a petroleum xylene fraction boiling in the range of about 280 to 325° F. The amount of solvent employed may vary considerably, preferably in the range of about one-half volume to two volumes per volume of oil-sulfonate employed. I prefer to regulate the proportion of solvent, oil and methanol in such a manner that the reaction product will separate into two phases, an upper methanol layer and a lower oil layer, thereby avoiding the necessity of redistilling the methanol after each operation. Methanol recovered in this manner can be recycled to the carbonation reaction where it is contacted with more lime and carbon dioxide.

Inasmuch as methanol and the xylene solvent are miscible in all proportions, it is only by virtue of the oil in the mixture that a separation can be effected into phases. This relationship is shown in the data plotted in FIGURE 2. Referring to FIGURE 2, it will be seen that, as the ratio of methanol to solvent decreases, the ratio of the methanol layer to the oil layer also decreases in the reaction mixture. At low ratios of methanol to solvent below about one, it will be seen that the ratio of the methanol layer to the oil layer is too low to be suitable for practical operation. Oil employed in making this diagram was a 40% solution of calcium mahogany sulfonate in which was dispersed about 28 grams of calcium carbonate per liter. The solvent used was petroleum xylene.

Methanol employed in my process is preferably anhydrous, that is, it contains less than about two-tenths of 1% of water. Although slightly larger amounts of water can be tolerated, not over 1%, larger amounts of water lead to a gel formation and to coarse particle size of carbonate particles in the finished product. In the carbonation reaction where carbon dioxide contacts the methanol and lime slurry, it is essential to control the time within rather narrow limits of the order of 1 to 10 minutes to prevent gelling of the complex which is formed between the methanol, lime, and $CO_2$. Gelling is prevented by then intimately mixing or quenching the carbonation reaction with the oil-sulfonate solution.

I have discovered that after mixing the methanol-lime $CO_2$ complex with the oil-dispersing agent, the reaction is not immediately completed but an appreciable time is required to bring about the desired reaction. If the mixture is allowed to separate immediately, a much longer time is required for the complex retained in the methanol phase to decompose. Accordingly, I provide a soaking time or an after-reaction time of about 20 to 60 minutes and as long as two hours in some cases. By maintaining the oil and methanol phase in intimate contact, this after-reaction time can be considerably reduced, generally to about 20 to 30 minutes, after which the reaction mixture is allowed to separate into two phases.

The amount of methanol employed in the reaction is usually about two to four volumes per volume of oil and dispersing agent employed. By using higher proportions of methanol, the heat of reaction can be absorbed as sensible heat in the methanol without necessity for additional cooling of the reaction mixture during carbonation.

The lime employed in my process can be commercial calcium oxide containing usually about 90 to 95% of pure calcium oxide, although oxide of higher purity is usually desirable. The amount of oxide employed in the reaction is preferably within the range of 15 to 30% based on the weight of oil and sulfonate used. When employing this amount of oxide, the final reaction product will usually have an alkali value within the range of 250 to 350 milligrams potassium hydroxide per gram equivalent, commonly known as the alkali value or "A.V."

Referring now to the drawing, FIGURE 1, is a slurry of lime and methanol is prepared in mixer 10, the lime being fed in by an automatic feeder, not shown, through inlet 11 and methanol by line 12. Agitator 13 maintains the slurry in uniform concentration. The resulting slurry, usually containing 1 part by weight of lime to 5 to 15 parts of methanol, is transferred continuously by line 14 controlled by valve 15 into the upper end of carbonator 16. Carbon dioxide gas is introduced into the lower end of 16 by line 17. The rate of addition of $CO_2$ is regulated to maintain a uniform ratio with the lime-methanol slurry. The contents of reactor 16 are maintained in rapid agitation by agitator 18. Any undissolved gases such as air or undissolved $CO_2$ are conducted through vent line 19 leading to condenser 20 and thence to receiver 21 from which any methanol condensate is returned by line 22 to mixer 10. The time required for the lime-methanol slurry to pass from the upper end of carbonator 16 to the bottom outlet 23 is usually about one to five minutes and rarely more than ten minutes. The heat of reaction developed in the carbonator may result in evaporation of methanol if the temperature rises substantially above 150° F., in which case methanol vapor will escape by vapor line 19 to the condenser 20. Accordingly, it is desirable to maintain a vapor space in the upper part of the carbonator to avoid carry over of lime slurry. In general, the temperature in carbonator 16 will vary from end to end, but will lie in the range of 125 to 160° F. At the lower end of the carbonator, the evaporation of methanol in contact with $CO_2$, introduced at 17, cools the reaction mixture and serves to delay gelling. Thus, the temperature at the top of the tower 16 may approach 150° F., whereas the temperature at the bottom may fall to 120 to 135° F.

Oil and sulfonate are mixed with solvent in feed tank 24 provided with agitator 25. The mixture, usually containing from one to two volumes of solvent such as commercial xylene per volume of oil, is conducted by lines 26 and 27 to the outlet of carbonator 23, flowing immediately to centrifugal pump 28 where the carbonated lime-methanol and the oil-sulfonate are intimately mixed and immediately charged by line 29 to after-reactor 30. The reactor 30 is provided with thorough agitation throughout, supplied as indicated by agitator 31. The volume of reactor 30 is selected to provide the necessary time for completing the reaction of oil, sulfonate, and methanol-lime complex. A small amount of carbon dioxide is generally evolved in this reaction, indicating that some calcium bicarbonate may be involved in the process. The volume of the reactor 30 can be easily calculated from the volume of the carbonator 16 and the ratio of methanol to oil-solvent feed. If, for example, the ratio of methanol to oil feed is 1 to 1 and if the reaction time in carbonator 16 is five minutes and the desired reaction time in reactor 30 is 6 times as long, i.e. 30 minutes, then the volume of reactor 30 will have to be 12 times the volume of carbonator 16.

From reactor 30, the reaction mixture flows by line 32 to settler 33 where the oil phase settles out continuously and is withdrawn by line 34 leading to the stripper 35. In stripper 35, methanol is distilled off by heating coil 36, the methanol vapor being conducted by line 37 to condenser 38, then to receiver 39 from which the methanol is returned by line 40 to mixer 10.

The methanol layer separating in 33 flows by line 41 to the lime mixer 10. Any carbon dioxide or other vapor collecting in separator 33 is vented by line 42. Recycled methanol may contain from 15 to 40% by volume of xylene solvent containing some sulfonate.

The temperature maintained in stripper 35 is usually about 240 to 270° F. I find it desirable to conduct the distillation in stripper 35 at a temperature sufficiently high to carry over a portion of the hydrocarbon solvent which serves to strip out more completely the methanol which is tenaciously retained in combination with the carbonate and sulfonate in some sort of complex. Usually, all the methanol cannot be removed in this manner, about 2 to 5% by volume based on oil-sulfonate being retained. However, if the amount of methanol is reduced to a minimum, there is less difficulty in the subsequent water treating step of my process.

From the base of stripper 35, the oil, now substantially free of uncombined methanol, is conducted by line 43 through cooler 44 to water treater 45. In 45, a small amount of water, usually 2–10% by volume, is introduced by line 46, preferably at a temperature in the range of 160–180° F. If it is injected at a higher temperature, I find that the reaction between the water and the residual methanol complex may result in too rapid evolution of methanol vapor and foaming over of the reaction mixture. Steam can also be introduced into the treater 45 by line 47, when desired. The water reaction usually requires approximately 15 minutes to one-half hour and good contact is obtained by means of a mechanical mixer, 48. It is important to remove liberated methanol rapidly to prevent degrading the carbonate dispersion by the action of aqueous methanol.

After the water treating reaction is completed, water and liberated methanol are driven off by heating coil 49, the vapor passing by line 50 to condenser 51 and receiver 52 where methanol and water are collected along with a small amount of hydrocarbon solvent which is subsequently recovered. In this operation, the temperature of the oil in 45 is usually raised to about 250° F. to insure complete elimination of water. The first portion of methanol collecting in 52, when operating batch-wise, will have only about 5 to 25% of water and may be segregated for re-use in the process, after adjusting the water to less than 1%, for example, by blending with new make-up methanol having less than 0.2% water content.

Dehydrated oil is now withdrawn by line 53 leading to filter 54 where the undissolved and unreacted lime and other solid particles, usually dirt which is contained in the lime purchased from the manufacturer, is removed. The clear solution of oil, solvent, and dispersed calcium carbonate now flows by line 55 to still 56 where the solvent is removed and solvent vapors are conducted by line 57 into condenser 58 and receiver 59. From receiver 59, the solvent flows by line 60 to the feed tank 24 hereinabove described.

The temperature required for completely removing the xylene solvent from the oil in still 56 is usually about 350–400° F. Removal of solvent from the oil is facilitated by the introduction of steam by a line not shown, in which case the solvent collected in 59 will be wet. Before wet solvent can be recycled to the process, it must be thoroughly dried to remove water; for example, by contacting with calcium chloride in a manner well known to the art.

From still 56, the finished product is conducted by line 61 to filter 62 where it is finally "polished" by filtering with the addition of a small amount of a filter aid such as diatomaceous earth, marketed under the names of "Dicalite," "Hi Flo," "Super Cel," etc., the amount required for this operation being of the order of one to three percent. The final product containing about 20 to 50 percent of dispersed calcium carbonate and having an alkali value usually in a range of 200 to 350 is withdrawn from the process by line 63.

Various modifications of my process will be apparent to those skilled in the art. Thus, for example, I may introduce additional liquid solvent into the stripper 35 by line 64. I may also employ solvent vapor, preferably superheated, for example, to 400 or 500° F., to aid the stripping of methanol in stripper 35, vapors being introduced by line 65, I can also employ a stripping tower in lieu of 35 in a continuous operation.

In a modified form of my process, I may introduce into 16 oil and sulfonate feed stock by alternative line 66, valve 67 being closed when operating in this manner. In this modification, the feed enters the carbonator at an intermediate point and flows down with the carbonated methanol-lime slurry from the upper part of carbonator 16. This mixture is contacted with carbon dioxide introduced at 17 which serves to evaporate from it a portion of the methanol, conducting methanol vapors into the cooler part of the carbonator at the top where the methanol is condensed and serves to dilute further and heat the slurry introduced by line 14, at the same time cooling the reaction product in the lower part of the carbonator 16.

The amount of heat evolved in the carbonation reaction has been determined by conducting the reaction in a calorimeter. The result obtained was 627 B.t.u. per pound of calcium oxide—somewhat less than the heat of formation of $CaCO_3$ from $CO_2$ and $CaO$ which is 755 B.t.u. per pound of CaO.

It should be understood that the operations conducted in stripper 35, water treater 45, and still 56 can be conducted either batch-wise or continuous with well known modifications of the equipment. When operating batch-wise, it is necessary to employ duplicate vessels manifolded for alternate operation, or a holding accumulator can be connected into line 34 to provide storage between batch runs on stripper 35.

As an example of my process, 22 kilograms of calcium oxide having a particle size between 300 and 325 mesh was mixed with 300 liters of methyl alcohol, of which 230 liters were recovered from earlier operations as in separator 33. The temperature of the slurry was 85° F. in three minutes and 150° F. in five minutes. At this time, the carbon dioxide was discontinued and 200 liters of a fifty-fifty mixture of xylene solvent and oil-sulfonate solution were rapidly mixed in. The oil-sulfonate solution contained approximately 40% of calcium sulfonate and had an ash value of about 8% (sulfated).

This mixture was intimately agitated for a period of 25 minutes and then allowed to settle for 10 minutes. At the end of 10 minutes, there was withdrawn 260 liters of methanol layer and 230 kilograms of a lower oil layer. The oil layer was diluted by addition of 100 liters of xylene solvent and then heated to 230° F. to remove methanol. At this point, some gelling began to take place on the heated surface.

The product was then treated with water by the addition of 20 liters of water, it was then heated to 260° F. to complete the water treatment, and 10 liters more water were added. Heating was continued to a temperature of 400° F. and the dehydrated oil was then filtered in contact with 4% of its weight of a diatomaceous earth filter aid known commercially as "Hy Flo." The clear oil was titrated against standard hydrochloric acid in the manner well known to the trade and tested 10 alkali vlaue using phenolphthalein as the indicator and 315 alkali value with methyl orange indicator.

It will be noted that, in this example, filtration of the oil when diluted with solvent was omitted. Referring to the drawing, this is equivalent to omitting the filter 54 and passing the water treated and dehydrated product directly from line 53 to still 56.

Having thus described my invention, what I claim is:

1. The process of preparing a dispersion of alkaline earth metal carbonate in oil wherein the particles of carbonate are substantially below 1/10 micron diameter which comprises preparing a suspension of alkaline earth oxide in methanol, charging said suspension to the top of a vertically elongated carbonation zone and countercurrently contacting it therein with an ascending stream of carbon dioxide gas introduced at the bottom of said zone while maintaining vigorous agitation therein, thereby absorbing substantially all the carbon dioxide introduced into the reaction mixture, then, within 10 minutes, before gelling occurs, withdrawing the carbonated stream of methanol and oxide from the bottom of said carbonation zone at the point of maximum $CO_2$ concentration and rapidly mixing and quenching said stream of carbonated reaction product with a stream of an oil solution of a dispersing agent in a continuous contacting zone, thereafter transferring the reaction mixture in the form of an emulsion to a reaction zone wherein the mixture is subjected to rapid agitation to prevent separation of phases, conducting the reaction mixture to a stripping zone where methanol is removed by distillation, conducting the oil from the stripping zone to a water treating zone where it is contacted at elevated temperature with a small amount of water to decompose remaining methanol complex, dehydrating the water treated oil and filtering it to remove undissolved solids, thereby producing a transparent oil product containing the desired alkaline earth carbonate in oil dispersion.

2. The process of claim 1 wherein the mixture of carbonated oxide and methanol combined with oil and dispersing agent is retained in rapid agitation in the reaction zone for a period of about 15 to 60 minutes before separating methanol.

3. The process of claim 1 wherein the alkaline earth metal oxide is calcium oxide and the amount employed is 15 to 30% by weight based on oil-dispersing agent employed in the reaction.

4. The process of claim 1 wherein the amount of alkaline earth oxide employed is at least 10% in excess of the stoichometric amount of the carbon dioxide introduced into said carbonation zone per unit of time.

5. The process of preparing a transparent dispersion of calcium carbonate in oil which comprises the following steps:

(1) slurrying finely powdered calcium oxide in 5 to 15 parts by weight of anhydrous methanol;
(2) continuously contacting a stream of the oxide slurry counter-currently with carbon dioxide flowing upwardly in a vertically elongated carbonation zone at about 125 to 160° F.;
(3) rapidly agitating said carbonation zone and withdrawing a stream of the reaction products therefrom at the point of maximum $CO_2$ concentration and before gelling occurs;
(4) intimately and rapidly mixing said reaction products stream with a stream of oil containing oil soluble calcium sulfonate in a mixing zone;
(5) transferring the resulting mixture to a reaction zone and maintaining intimate contact between oil and methanol phases therein for a period of at least twenty minutes;
(6) separating a methanol phase from the oil phase and recycling it to step 1) of the process;

(7) stripping uncombined methanol remaining dissolved in the oil phase;
(8) treating the stripped oil with 2 to 10 percent of water in a water treating zone;
(9) dehydrating the water treated oil at a temperature of at least 250° F.;
(10) Filtering the dehydrated oil to remove dirt and unreacted lime.

6. The process of claim 5 wherein one half to two volumes of hydrocarbon solvent are present in the oil in steps 7 and 8.

References Cited by the Examiner
UNITED STATES PATENTS
3,105,049   9/1963   Voorhees _____ 252—33

DANIEL E. WYMAN, *Primary Examiner.*

P. P. GARVIN, *Assistant Examiner.*